United States Patent
Kim et al.

(10) Patent No.: US 11,778,007 B2
(45) Date of Patent: Oct. 3, 2023

(54) SERVER, METHOD AND USER DEVICE FOR PROVIDING VIRTUAL REALITY CONTENT

(71) Applicant: KT CORPORATION, Seongnam-si (KR)

(72) Inventors: Kang Tae Kim, Seoul (KR); Ki Hyuk Kim, Gyeonggi-do (KR); I Gil Kim, Gyeonggi-do (KR)

(73) Assignee: KT CORPORATION, Seongnam-si (KR)

( * ) Notice: Subject to any disclaimer, the term of this patent is extended or adjusted under 35 U.S.C. 154(b) by 0 days.

(21) Appl. No.: 17/267,743

(22) PCT Filed: Aug. 13, 2019

(86) PCT No.: PCT/KR2019/010308
§ 371 (c)(1),
(2) Date: Feb. 10, 2021

(87) PCT Pub. No.: WO2020/036414
PCT Pub. Date: Feb. 20, 2020

(65) Prior Publication Data
US 2021/0314380 A1 Oct. 7, 2021

(30) Foreign Application Priority Data
Aug. 14, 2018 (KR) .................. 10-2018-0094867

(51) Int. Cl.
*H04L 65/60* (2022.01)
*G06T 7/50* (2017.01)
(Continued)

(52) U.S. Cl.
CPC ............... *H04L 65/60* (2013.01); *G06T 7/50* (2017.01); *G06T 17/10* (2013.01); *G06T 19/00* (2013.01)

(58) Field of Classification Search
None
See application file for complete search history.

(56) References Cited

U.S. PATENT DOCUMENTS

| 7,787,818 B2 * | 8/2010 | Shapiro .................. H04W 4/02 455/3.06 |
| 9,606,363 B2 | 3/2017 | Zalewski |

(Continued)

FOREIGN PATENT DOCUMENTS

| KR | 101399633 B1 | 5/2014 |
| KR | 101538947 B1 | 7/2015 |

(Continued)

OTHER PUBLICATIONS

Puso et al., "An embedded mesh method in a multiple material ALE", Comput. Methods Appl. Mech. Engrg. 245-246 (2012) 273-289 (Year: 2012).*

(Continued)

*Primary Examiner* — Saptarshi Mazumder
(74) *Attorney, Agent, or Firm* — HAMRE, SCHUMANN, MUELLER & LARSON, P.C.

(57) ABSTRACT

A content providing server provides virtual reality content. The content providing server includes a requesting unit configured to receive a request for virtual reality content from a user device; a dynamic object image processing unit configured to render an image of a dynamic object contained in the virtual reality content; a static object image processing unit configured to render an image of a static object contained in the virtual reality content; and a streaming unit configured to separately stream the image of the dynamic object and the image of the static object to the user device.

18 Claims, 13 Drawing Sheets

(51) Int. Cl.
*G06T 17/10* (2006.01)
*G06T 19/00* (2011.01)

(56) References Cited

U.S. PATENT DOCUMENTS

| | | | | |
|---|---|---|---|---|
| 2004/0248653 | A1* | 12/2004 | Barros | A63F 13/60 |
| | | | | 463/43 |
| 2005/0256923 | A1* | 11/2005 | Adachi | G06F 9/452 |
| | | | | 709/203 |
| 2006/0236231 | A1* | 10/2006 | Allen | G06F 40/103 |
| | | | | 715/244 |
| 2012/0105581 | A1* | 5/2012 | Berestov | H04N 13/275 |
| | | | | 348/43 |
| 2015/0302110 | A1* | 10/2015 | Deng | G06F 40/106 |
| | | | | 715/234 |
| 2016/0283081 | A1* | 9/2016 | Johnston | H04N 5/23216 |
| 2017/0161948 | A1* | 6/2017 | Hua | G06T 7/75 |
| 2019/0244270 | A1* | 8/2019 | Kim | G06F 16/732 |
| 2019/0268601 | A1* | 8/2019 | Lu | H04N 19/70 |

FOREIGN PATENT DOCUMENTS

| | | | |
|---|---|---|---|
| KR | 1020150090364 | A | 8/2015 |
| KR | 1020160016406 | A | 2/2016 |
| KR | 1020160147495 | A | 12/2016 |
| KR | 1020170017700 | A | 2/2017 |
| KR | 1020170115390 | A | 10/2017 |
| KR | 101851338 | B1 | 4/2018 |

OTHER PUBLICATIONS

International Search Report of PCT/KR2019/010308 dated Nov. 29, 2019.

* cited by examiner

SERVER, METHOD AND USER DEVICE FOR PROVIDING VIRTUAL REALITY CONTENT

TECHNICAL FIELD

The present disclosure relates to a server, a method and a user device for providing virtual reality content.

BACKGROUND

Virtual Reality (VR) is an interface between a human and a computer that makes a specific environment or situation into a virtual world through computer work and makes the human in the virtual world feel as if he/she interacted with real surroundings and environment.

VR is a technology that allows people to see and manipulate what they enter without having to directly experience an environment that is difficult for them to experience in their daily life and has been used in various fields such as tank and aircraft simulation training, furniture layout design, surgery practice and game.

In this regard, Korean Patent Laid-open Publication No. 2017-0115390, which is one of prior arts, discloses a system for implementing three-dimensional (3D) virtual reality.

However, when an image with VR technology is streamed remotely, a monocular image is streamed to a device according to a conventional technology, which causes a deterioration in 3D effect of the VR image.

DISCLOSURE OF THE INVENTION

Problems to be Solved by the Invention

In view of the foregoing, the present disclosure provides a server, a method and a user device for providing virtual reality content that can enhance the 3D effect of the virtual reality content by separately rendering a dynamic object and a static object.

The present disclosure provides a server, a method and a user device for providing virtual reality content that can reduce a rendering load by rendering and streaming a static object only when an event occurs on the server side.

The present disclosure provides a server, a method and a user device for providing virtual reality content that can provide a user with an improved sense of immersion in the virtual reality content containing a dynamic object and a static object rendered separately.

However, the problems to be solved by the present disclosure are not limited to the above-described problems. There may be other problems to be solved by the present disclosure.

Means for Solving the Problems

According to at least one example embodiment, a content providing server that provides virtual reality content may include a requesting unit configured to receive a request for virtual reality content from a user device; a dynamic object image processing unit configured to render an image of a dynamic object contained in the virtual reality content; a static object image processing unit configured to render an image of a static object contained in the virtual reality content; and a streaming unit configured to separately stream the image of the dynamic object and the image of the static object to the user device.

According to at least one other example embodiment, a user device that provides virtual reality content may include a requesting unit configured to request virtual reality content to a content providing server; a dynamic object image receiving unit configured to receive an image of a dynamic object contained in the virtual reality content; a static object image receiving unit configured to receive an image of a static object contained in the virtual reality content; and an output unit configured to output the image of the static object and the image of the dynamic object by using at least one mesh, wherein the dynamic object image receiving unit and the static object image receiving unit are further configured to receive a stream of the image of the dynamic object and a stream of the image of the static object, respectively, from the content providing server.

According to at least one other example embodiment, a method for providing virtual reality content may include receiving a request for virtual reality content from a user device; rendering an image of a dynamic object contained in the virtual reality content; rendering an image of a static object contained in the virtual reality content; and separately streaming the image of the dynamic object and the image of the static object to the user device.

This summary is provided by way of illustration only and should not be construed as limiting in any manner. Besides the above-described exemplary embodiments, there may be additional exemplary embodiments that become apparent by reference to the drawings and the detailed description that follows.

Effects of the Invention

According to the present disclosure, it is possible to provide a server, a method and a user device for providing virtual reality content that can enhance the 3D effect of the virtual reality content by separately rendering a dynamic object and a static object.

It is possible to provide a server, a method and a user device for providing virtual reality content that can reduce a rendering load by rendering and streaming a static object only when an event occurs on the server side.

It is possible to provide a server, a method and a user device for providing virtual reality content that can provide a user with an improved sense of immersion in the virtual reality content containing a dynamic object and a static object rendered separately.

BEST MODE FOR CARRYING OUT THE INVENTION

Figure 1:
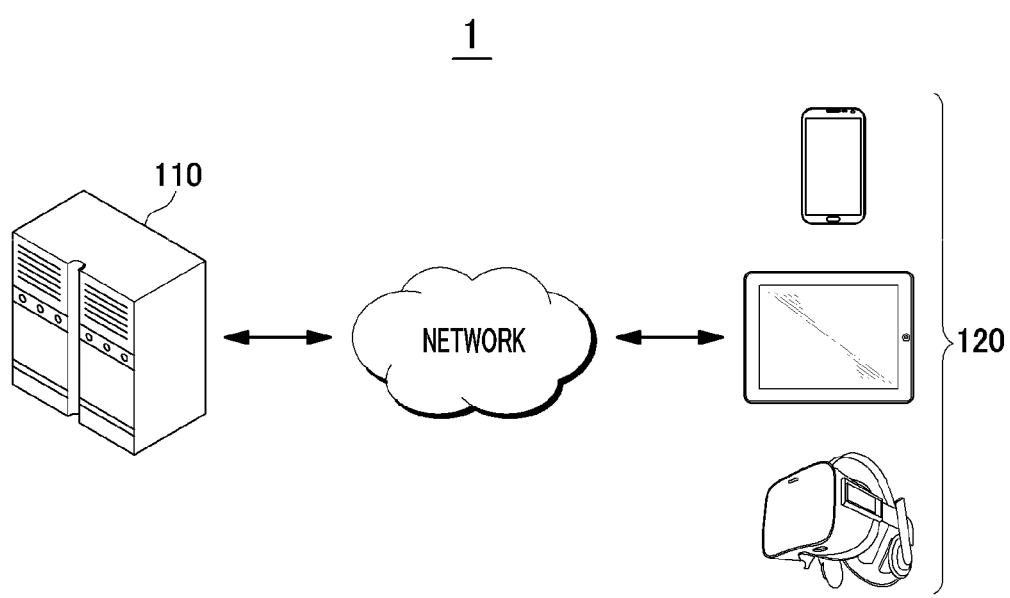
FIG. 1 illustrates the configuration of a content providing system in accordance with an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Hereinafter, embodiments of the present disclosure will be explained in detail with reference to the accompanying drawings.

FIG. 1 illustrates the configuration of a content providing system in accordance with an embodiment of the present disclosure. Referring to FIG. 1, a content providing system 1 may include a content providing server 110 and a user device 120. The content providing server 110 and the user device 120 are examples of the components that can be controlled by the content providing system 1.

The components of the content providing system 1 illustrated in FIG. 1 are typically connected to each other via a network. For example, as illustrated in FIG. 1, the user device 120 may be connected to the content providing server 110 simultaneously or sequentially.

The network refers to a connection structure that enables information exchange between nodes such as devices and servers, and includes LAN (Local Area Network), WAN (Wide Area Network), Internet (WWW: World Wide Web), a wired or wireless data communication network, a telecommunication network, a wired or wireless television network and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi and the like, but may not be limited thereto.

The content providing server 110 may receive a request for virtual reality content from the user device 120.

The content providing server 110 may render an image of a dynamic object contained in the virtual reality content. In this case, the content providing server 110 may render the image of the dynamic object by using an image taken based on the location of a user in the virtual reality content.

The content providing server 110 may render an image of a static object contained in the virtual reality content. In this case, the content providing server 110 may render the image of the static object by using the image taken based on the user's location in the virtual reality content. Also, the content providing server 110 may derive a depthmap from the image taken based on the user's location in the virtual reality content.

The content providing server 110 may separately stream the image of the dynamic object and the image of the static object to the user device 120. The content providing server 110 may stream a rendered image of a dynamic object to the user device 120 in real time. The content providing server 110 may stream a rendered image of a static object to the user device 120 depending on whether or not a predetermined event occurs in the virtual reality content. For example, the content providing server 110 may stream the image of the static object when the virtual reality content starts to be reproduced. As another example, the content providing server 110 may stream the image of the static object when a scene in the virtual reality content is required to be updated. As yet another example, the content providing server 110 may stream the image of the static object when the user's location in the virtual reality content reaches a predetermined area. As still another example, the content providing server 110 may stream the image of the static object when an update time for the image of the static object exceeds a predetermined time.

The content providing server 110 may stream the depthmap to the user device 120.

The user device 120 may request the virtual reality content from the content providing server 110.

The user device 120 may receive the rendered image of the dynamic object contained in the virtual reality content. In this case, the user device 120 may separately receive a stream of the image of the dynamic object from the content providing server 110. Also, the user device 120 may receive a stream of the image of the dynamic object from the content providing server 110 in real time.

The user device 120 may receive the rendered image of the static object contained in the virtual reality content. In this case, the user device 120 may separately receive a stream of the image of the static object from the content providing server 110.

The user device 120 may receive a stream of the rendered image of the static object from the content providing server 110 depending on whether or not a predetermined event occurs in the virtual reality content. For example, the user device 120 may receive a stream of the image of the static object when the virtual reality content starts to be reproduced. As another example, the user device 120 may receive a stream of the image of the static object when a scene in the virtual reality content is required to be updated. As yet another example, the user device 120 may receive the image of the static object when the user's location in the virtual reality content reaches a predetermined area. As still another example, the user device 120 may receive a stream of the image of the static object when an update time for the image of the static object exceeds a predetermined time.

The user device 120 may receive a stream of a depthmap derived from the image taken based on the user's location in the virtual reality content.

The user device 120 may output the image of the static object and the image of the dynamic object by using at least one mesh. For example, the user device 120 may overlay and output the image of the dynamic object on a first mesh, and may overlay and output the image of the static object on a second mesh to which the depthmap has been applied. In this case, the first mesh may be located inside the second mesh.

Figure 2:
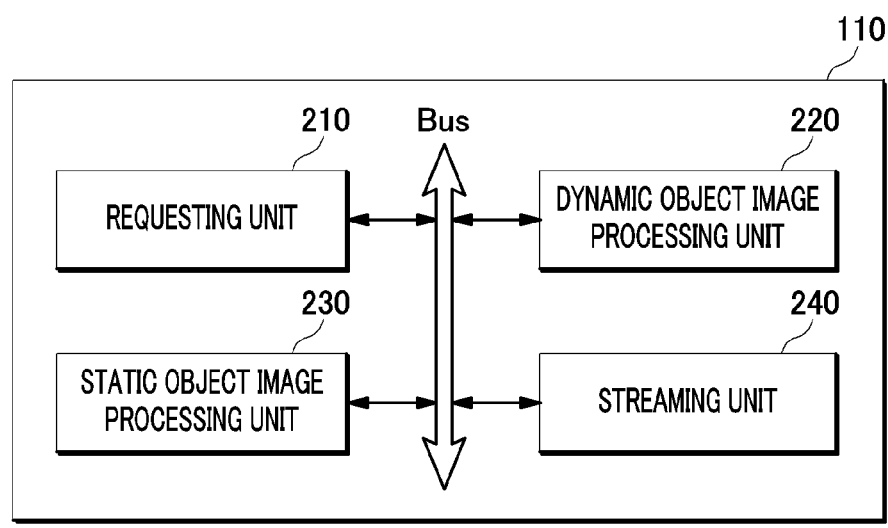
FIG. 2 illustrates the configuration of a content providing server in accordance with an embodiment of the present disclosure.

FIG. 2 illustrates the configuration of a content providing server in accordance with an embodiment of the present disclosure. Referring to FIG. 2, the content providing server 110 may include a requesting unit 210, a dynamic object image processing unit 220, a static object image processing unit 230 and a streaming unit 240.

The requesting unit 210 may receive a request for virtual reality content from the user device 120.

The dynamic object image processing unit 220 may render an image of a dynamic object contained in the virtual reality content. The dynamic object image processing unit 220 may render the image of the dynamic object by using an image taken based on the user's location in the virtual reality content. For example, the dynamic object image processing unit 220 may render all front information by using six camera modules in real time. In this case, an alpha value may be set to "0" so that the whole area occupied by the static object in a rendered area is processed to be transparent.

The static object image processing unit 230 may render an image of a static object contained in the virtual reality content. The static object image processing unit 230 may render the image of the static object by using the image taken based on the user's location in the virtual reality content. Here, the static object refers to an object whose data is not changed in the flow of the virtual reality content, and includes, for example, a background or a space. For example, the static object image processing unit 230 may render the front of the user into a cubic or equirectangular format using a 6-side camera.

The static object image processing unit 230 may derive a depthmap from the image taken based on the user's location in the virtual reality content. The depthmap may be a distance value for 3D data corresponding to each pixel based on the location of a user.

The streaming unit 240 may separately stream the image of the dynamic object and the image of the static object to the user device 120.

The streaming unit 240 may stream the image of the dynamic object to the user device 120 in real time.

The streaming unit 240 may stream a rendered image of a static object to the user device 120 depending on whether or not a predetermined event occurs in the virtual reality content. Here, the event may include a case where a static object needs to be newly rendered. For example, the streaming unit 240 may stream the image of the static object when the virtual reality content starts to be reproduced. As another example, the streaming unit 240 may stream the image of the static object when a scene in the virtual reality content is required to be updated, such as changing a scene or a stage constituting graphics in the virtual reality content. As yet another example, the streaming unit 240 may stream the image of the static object when the user's location in the virtual reality content reaches a predetermined area, such as the boundary of an area. As still another example, the streaming unit 240 may stream the image of the static object when an update time for the image of the static object exceeds a predetermined time.

The streaming unit 240 may stream the depthmap to the user device 120.

Figure 3A:
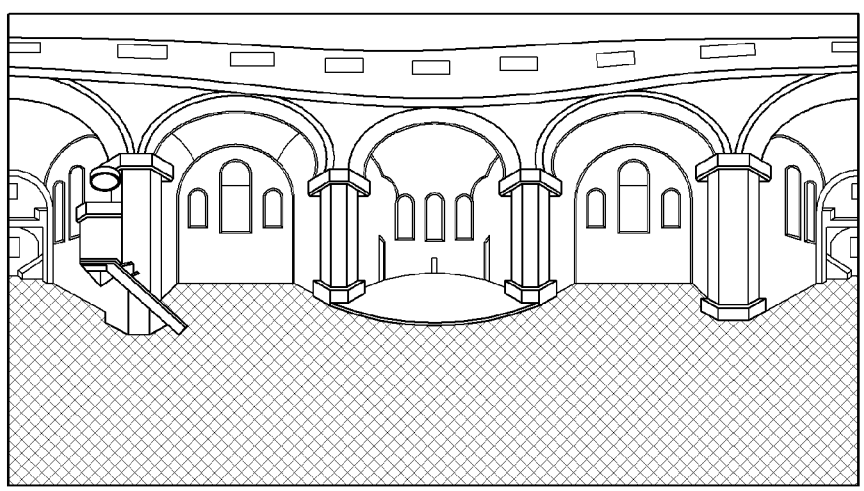
FIG. 3A is an example depiction showing the result of rendering a static object and a dynamic object in accordance with an embodiment of the present disclosure.
Figure 3B:
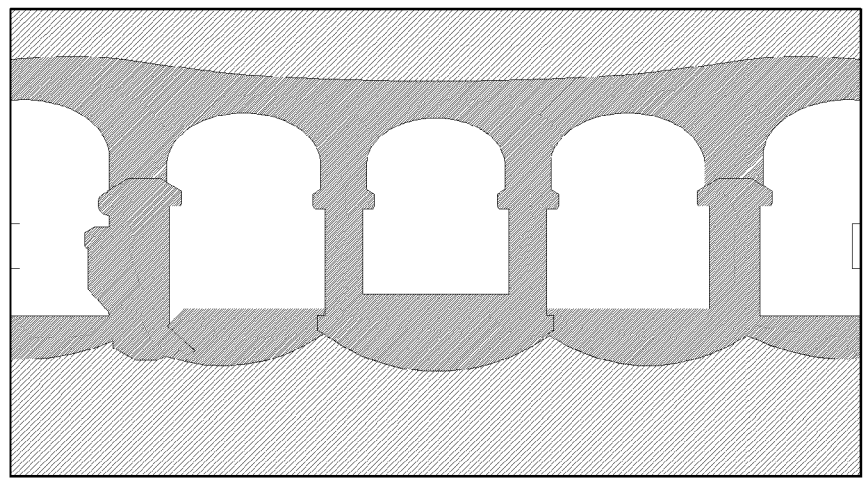
FIG. 3B is an example depiction showing the result of rendering a static object and a dynamic object in accordance with an embodiment of the present disclosure.
Figure 3C:
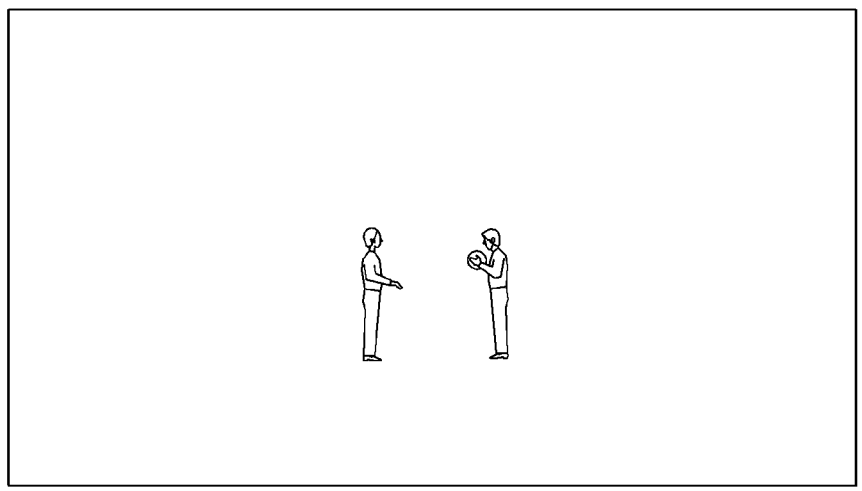
FIG. 3C is an example depiction showing the result of rendering a static object and a dynamic object in accordance with an embodiment of the present disclosure.

FIG. 3A through FIG. 3C are example depictions showing the result of rendering a static object and a dynamic object in accordance with an embodiment of the present disclosure. Here, the static object may be rendered only when an event occurs, and the dynamic object may be separately rendered in real time.

FIG. 3A is an example depiction showing the result of rendering a static object in accordance with an embodiment of the present disclosure. Referring to FIG. 3A, the content providing server 110 may render an image of a static object contained in virtual reality content. For example, the content providing server 110 may render an image of an object, such as a background or a space, whose data is not changed in the flow of the virtual reality content.

FIG. 3B is an example depiction showing a depthmap in accordance with an embodiment of the present disclosure. Referring to FIG. 3B, when the image of the static object is rendered, a depthmap may be included in the result of rendering. Here, the depthmap may be a distance value for 3D data corresponding to each pixel based on the location of a user.

FIG. 3C is an example depiction showing the result of rendering a dynamic object in accordance with an embodiment of the present disclosure. Referring to FIG. 3C, the content providing server 110 may render an image of a dynamic object contained in the virtual reality content. For example, the content providing server 110 may render all front information and set an alpha value to "0" so that the whole area occupied by the static object in a rendered area is processed to be transparent. Thus, the content providing server 110 can render the image of the dynamic object.

Figure 4:
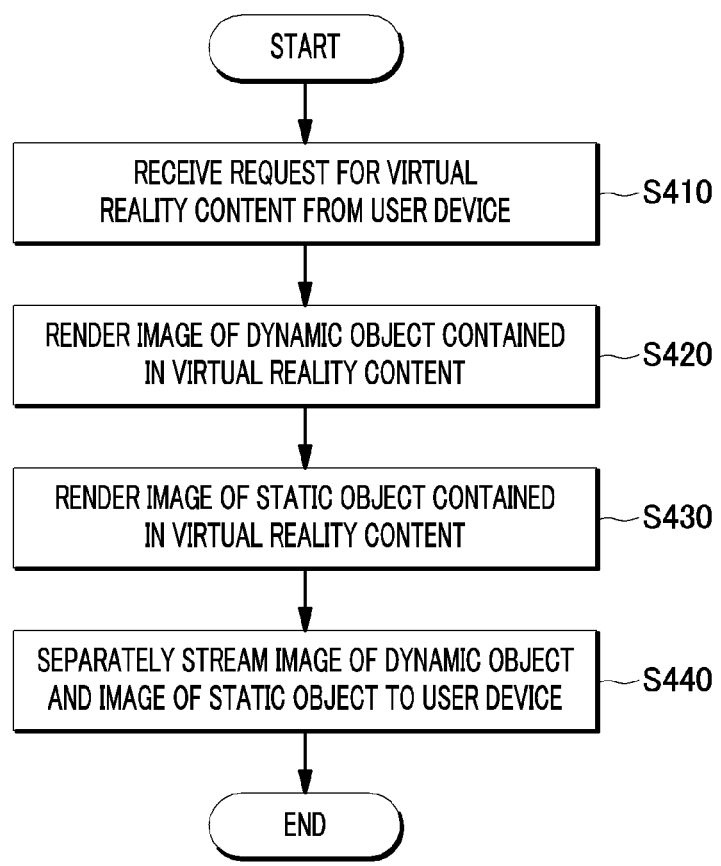
FIG. 4 is a flowchart illustrating a method for providing virtual reality content by a content providing server in accordance with an embodiment of the present disclosure.

FIG. 4 is a flowchart illustrating a method for providing virtual reality content by a content providing server in accordance with an embodiment of the present disclosure. The method for providing virtual reality content by the content providing server 110 illustrated in FIG. 4 includes the processes time-sequentially performed by the content providing system 1 according to the embodiment illustrated in FIG. 1 through FIG. 3C. Therefore, descriptions of the processes performed by the content providing system 1 may be applied to the method for providing virtual reality content by the content providing server 110 according to the embodiment illustrated in FIG. 1 through FIG. 3C, even though they are omitted hereinafter.

In process S410, the content providing server 110 may receive a request for virtual reality content from the user device 120.

In process S420, the content providing server 110 may render an image of a dynamic object contained in the virtual reality content.

In process S430, the content providing server 110 may render an image of a static object contained in the virtual reality content.

In process S440, the content providing server 110 may separately stream the image of the dynamic object and the image of the static object to the user device 120.

In the descriptions above, the processes S410 through S440 may be divided into additional processes or combined into fewer processes depending on an embodiment. In addition, some of the processes may be omitted and the sequence of the processes may be changed if necessary.

Figure 5:
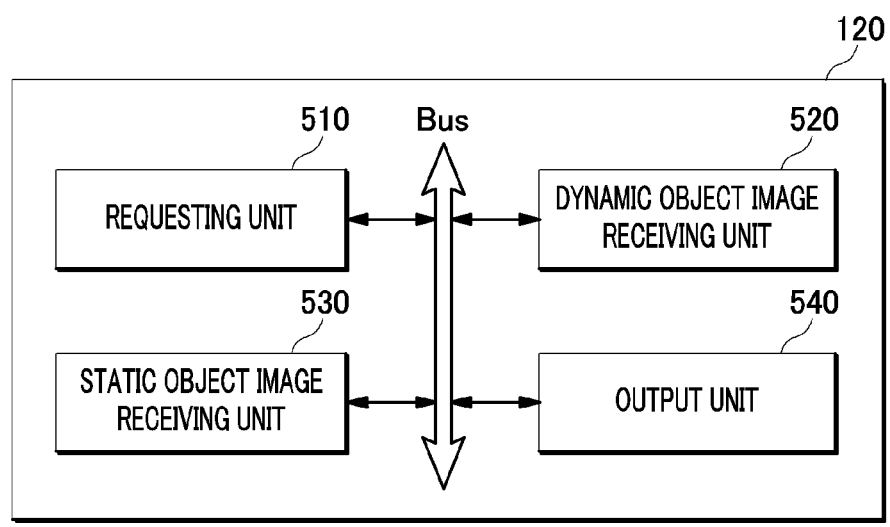
FIG. 5 illustrates the configuration of a user device in accordance with an embodiment of the present disclosure.

FIG. 5 illustrates the configuration of a user device in accordance with an embodiment of the present disclosure. Referring to FIG. 5, the user device 120 may include a requesting unit 510, a dynamic object image receiving unit 520, a static object image receiving unit 530 and an output unit 540.

The requesting unit 510 may request virtual reality content from the content providing server 110.

The dynamic object image receiving unit 520 may receive a rendered image of a dynamic object contained in the virtual reality content. In this case, the dynamic object image receiving unit 520 may separately receive a stream of the image of the dynamic object from the content providing server 110. For example, the dynamic object image receiving unit 520 may receive a stream of the image of the dynamic object from the content providing server 110 in real time.

The static object image receiving unit 530 may receive a rendered image of a static object contained in the virtual reality content. In this case, the static object image receiving unit 530 may separately receive a stream of the image of the static object from the content providing server 110.

The static object image receiving unit 530 may receive a stream of the rendered image of the static object from the content providing server 110 depending on whether or not a predetermined event occurs in the virtual reality content. For example, the static object image receiving unit 530 may receive a stream of the image of the static object when the virtual reality content starts to be reproduced. As another example, the static object image receiving unit 530 may receive a stream of the image of the static object when a scene in the virtual reality content is required to be updated. As yet another example, the static object image receiving unit 530 may receive a stream of the image of the static object when the user's location in the virtual reality content reaches a predetermined area. As still another example, the static object image receiving unit 530 may receive a stream of the image of the static object when an update time for the image of the static object exceeds a predetermined time.

The static object image receiving unit 530 may receive a stream of a depthmap derived from an image taken based on the user's location in the virtual reality content.

The output unit 540 may output the image of the static object and the image of the dynamic object by using at least one mesh. Here, the mesh is made up of minimum unit triangles for processing a plane in 3D data, and refers to data including a relationship with the points of a triangle. For example, a 3D model may have a texture overlaid on a cubic or spherical mesh. The mesh will be described in detail with reference to FIG. 6.

Figure 6:
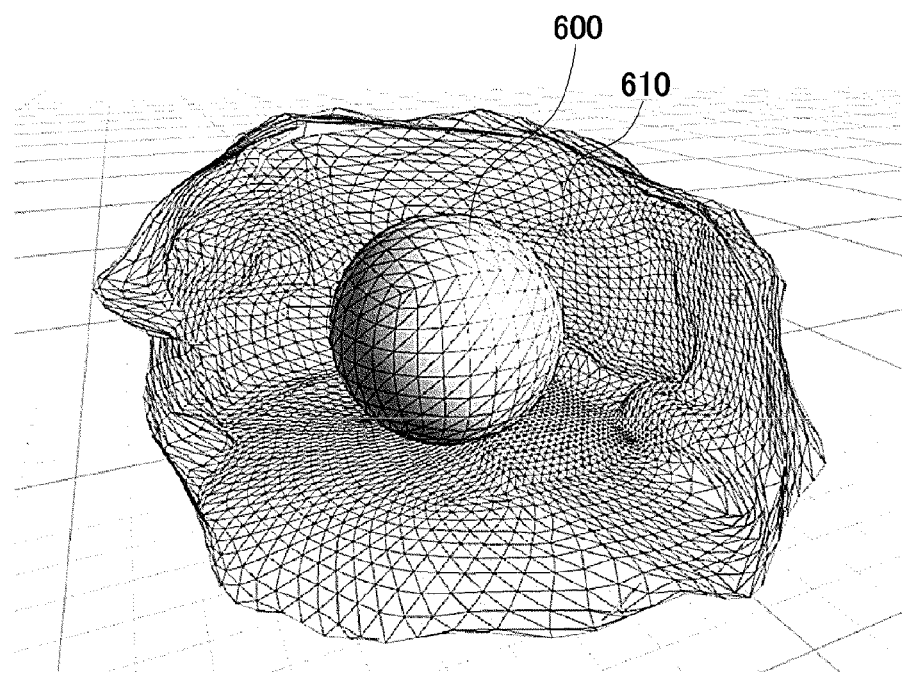
FIG. 6 is an example depiction illustrating a mesh in accordance with an embodiment of the present disclosure.

FIG. 6 is an example depiction illustrating a mesh in accordance with an embodiment of the present disclosure. Referring to FIG. 6, the mesh may include a first mesh 600 which is a conventional spherical mesh and a second mesh 610 which is a deformed mesh. Here, the second mesh 610 may be deformed based on the depthmap. For example, the second mesh 610 may be deformed based on the depthmap so that the distance from each vertex of a cube or sphere to be modified with reference to the initial location of a virtual camera is equal to a depth value extracted from the depthmap. Here, a high-pass filter and a low-pass filter may be applied to the modified distance.

The location of each point constituting the second mesh 610 may be moved according to the depthmap by using Equation 1.

$$\vec{V_2} = \alpha \vec{V_1} - (1-\alpha)(2D_1-1)(\vec{V_1}-\vec{C_1}) \qquad \text{[Equation 1]}$$

Herein, $\vec{V_1}$, $\vec{V_2}$ are the location values of each point before and after modification, respectively, and have vector data (x, y, z). Also, α is a constant and represents a parameter for adjusting a weighting of the original location value and a weighting of the modified position value. Here, D1 represents a depth value of the depthmap corresponding to a point in the mesh. Also, C1 represents a point of gaze of a user used as a reference for rendering and defined in virtual reality.

The second mesh 610 may be torn when the degree of deformation is high. Therefore, the user may set the degree of deformation of the mesh to suppress tearing of the mesh.

Referring to FIG. 5 again, the output unit 540 may overlay and output an image (texture) of a dynamic object on a first mesh (for example, spherical mesh), and may overlay and output an image (texture) of a static object on a second mesh (for example, deformed mesh) to which a depthmap has been applied. In this case, the first mesh is located inside the second mesh, and, thus, the overlay effect can be increased. The output unit 540 may render and output a final screen by setting the center of the first mesh (for example, spherical mesh) on which the dynamic object has been output as a point of gaze of the user.

FIG. 7A through FIG. 7E are example depictions to explain a process for outputting an image of a static object and an image of a dynamic object by a user device using at least one mesh in accordance with an embodiment of the present disclosure.

Figure 7A:
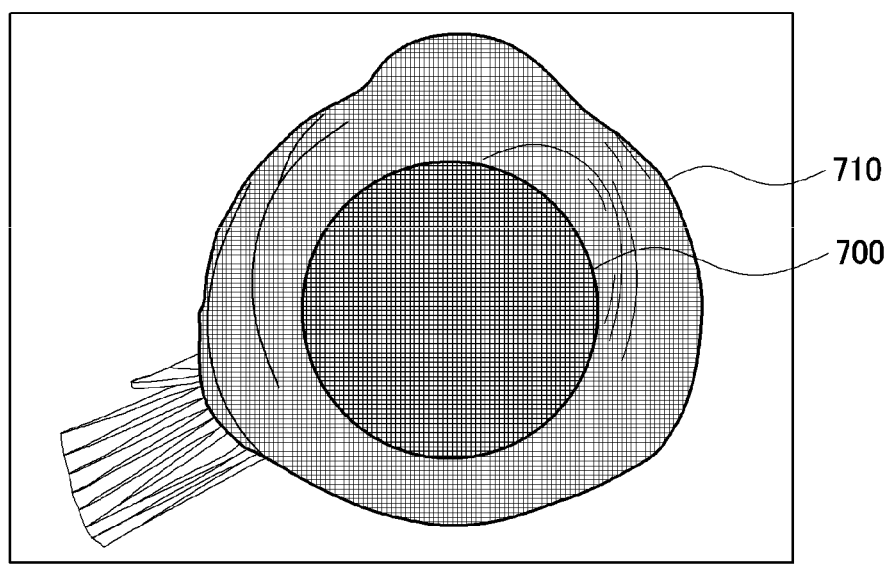
FIG. 7A is an example depiction to explain a process for outputting an image of a static object and an image of a dynamic object by a user device using a mesh in accordance with an embodiment of the present disclosure.

FIG. 7A is an example depiction illustrating a mesh in accordance with an embodiment of the present disclosure. Referring to FIG. 7A, the mesh may include a first mesh 700 and a second mesh 710. Here, the first mesh 700 may be located inside the second mesh 710.

An image of a dynamic object may be overlaid on the first mesh 700.

A depthmap may be applied to the second mesh 710 and an image of a static object may be overlaid on the second mesh 710. Here, the second mesh 710 may be deformed based on the depthmap depending on whether or not a predetermined event occurs in virtual reality content.

Figure 7B:
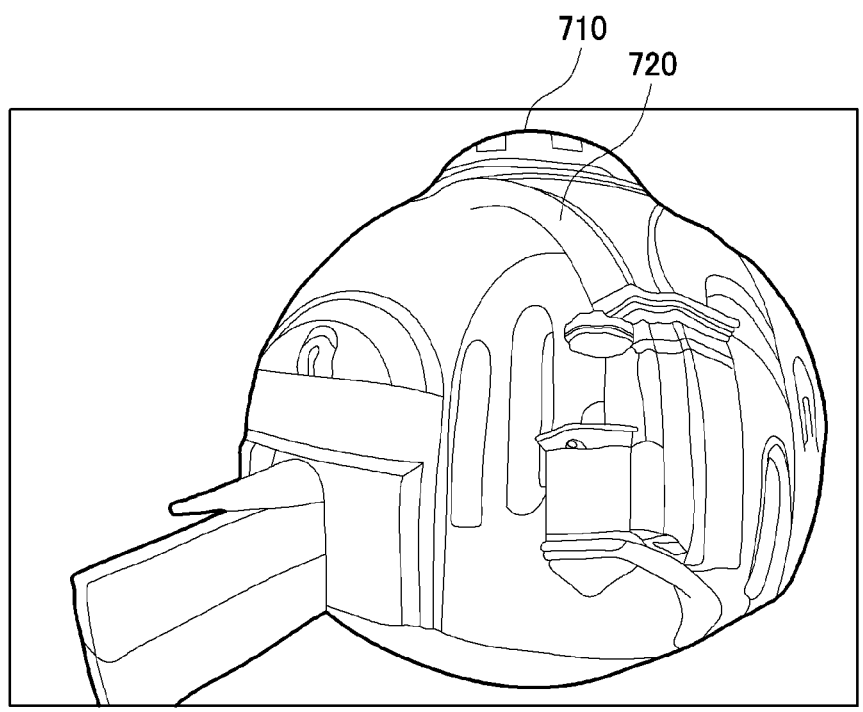
FIG. 7B is an example depiction to explain a process for outputting an image of a static object and an image of a dynamic object by a user device using a mesh in accordance with an embodiment of the present disclosure.

FIG. 7B is an example depiction illustrating a second mesh overlaid with an image of a static object in accordance with an embodiment of the present disclosure. Referring to FIG. 7B, an image 720 of a static object may be overlaid on the second mesh 710 which is a mesh deformed based on the depth map.

Figure 7C:
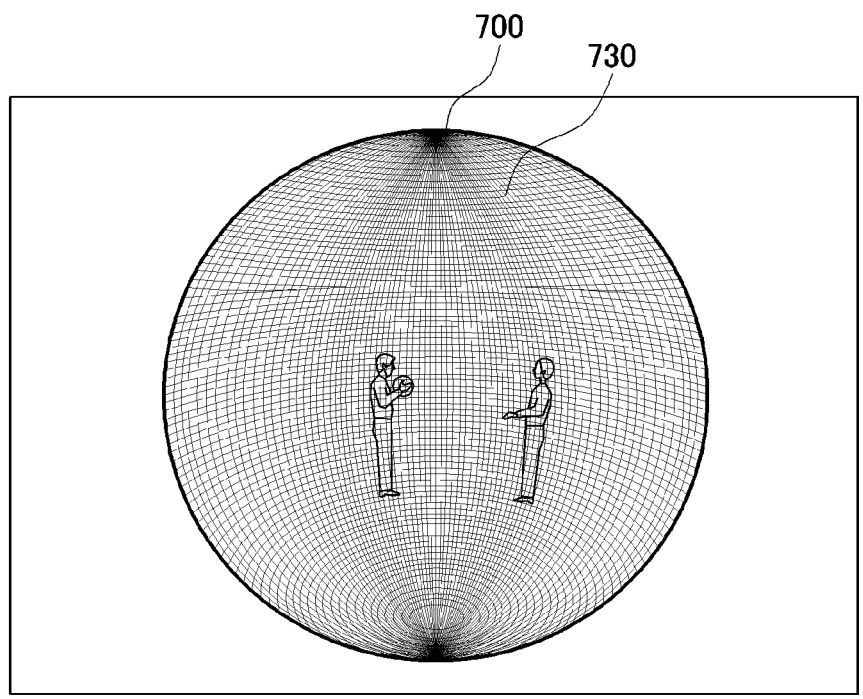
FIG. 7C is an example depiction to explain a process for outputting an image of a static object and an image of a dynamic object by a user device using a mesh in accordance with an embodiment of the present disclosure.

FIG. 7C is an example depiction illustrating a first mesh overlaid with an image of a dynamic object in accordance with an embodiment of the present disclosure. Referring to FIG. 7C, an image 730 of a dynamic object may be overlaid on the first mesh 700 which is a spherical mesh.

Figure 7D:
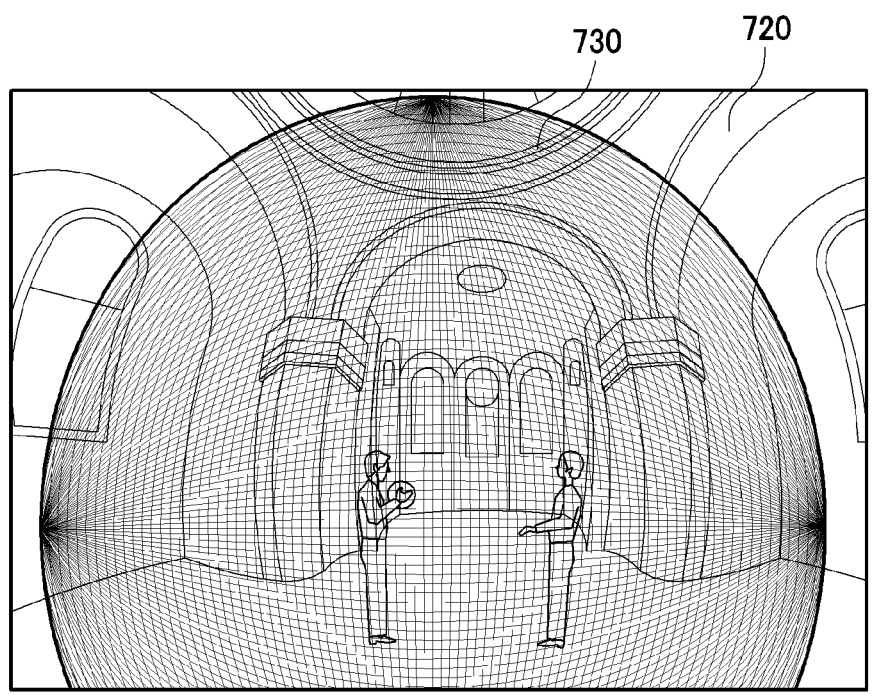
FIG. 7D is an example depictions to explain a process for outputting an image of a static object and an image of a dynamic object by a user device using a mesh in accordance with an embodiment of the present disclosure.

FIG. 7D is an example depiction showing the result of rendering virtual reality content in accordance with an embodiment of the present disclosure. Referring to FIG. 7D, the user device 120 may render the image 730 of the dynamic object overlaid on the first mesh 700 and the image 720 of the static object overlaid on the second mesh 710. In this case, the user device 120 may stereo render a final screen on which the result of rendering the image 720 of the static object and the result of rendering the image 730 of the dynamic object have been overlaid.

Figure 7E:
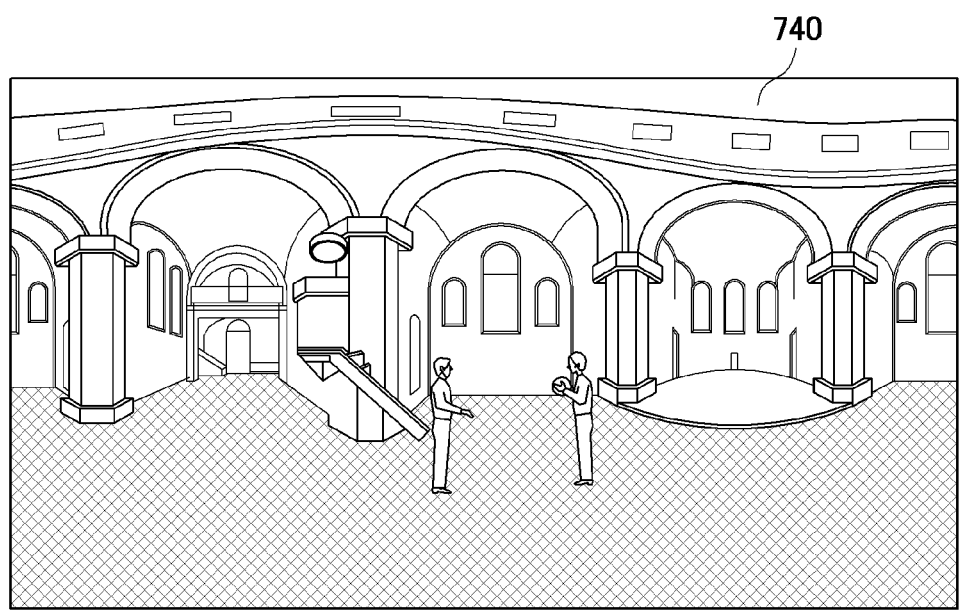
FIG. 7E is an example depiction to explain a process for outputting an image of a static object and an image of a dynamic object by a user device using a mesh in accordance with an embodiment of the present disclosure.

FIG. 7E is an example depiction illustrating virtual reality content output by a user device in accordance with an embodiment of the present disclosure. Referring to FIG. 7E, the user device 120 may display, on a display, a virtual reality content image 740 in which the rendered image 720 of the static object and the rendered image 730 of the dynamic object are synthesized.

Figure 8:
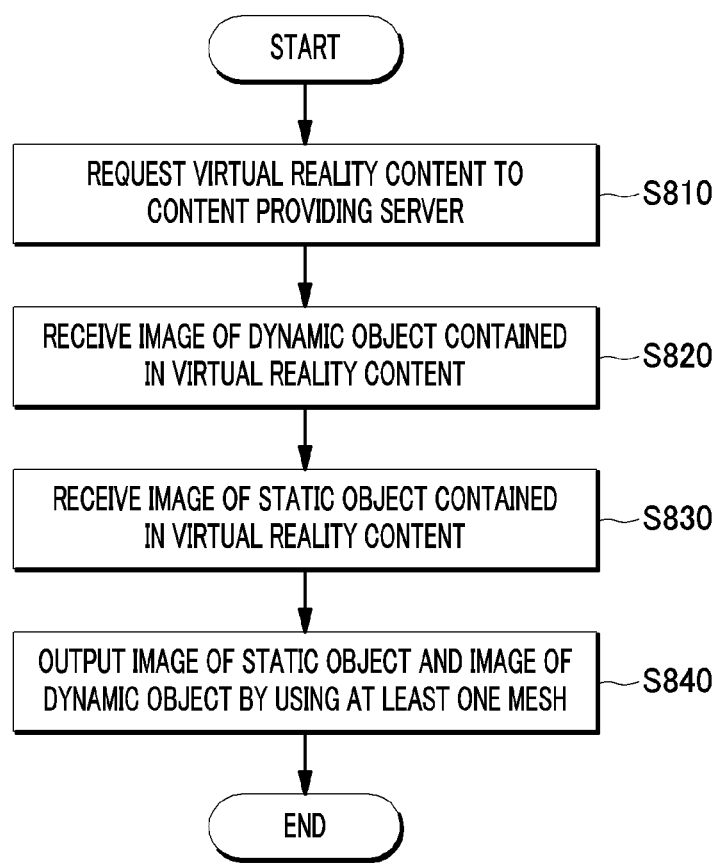
FIG. 8 is a flowchart illustrating a method for providing virtual reality content by a user device in accordance with an embodiment of the present disclosure.

FIG. 8 is a flowchart illustrating a method for providing virtual reality content by a user device in accordance with an embodiment of the present disclosure. The method for providing virtual reality content by the user device 120 illustrated in FIG. 8 includes the processes time-sequentially performed by the content providing system 1 according to the embodiment illustrated in FIG. 1 through FIG. 7D. Therefore, descriptions of the processes performed by the content providing system 1 may be applied to the method for providing virtual reality content by the user device 120 according to the embodiment illustrated in FIG. 1 through FIG. 7D, even though they are omitted hereinafter.

In process S810, the user device 120 may request virtual reality content from the content providing server 110.

In process S820, the user device 120 may receive a rendered image of a dynamic object contained in the virtual reality content.

In process S830, the user device 120 may receive a rendered image of a static object contained in the virtual reality content.

In process S840, the user device 120 may output the image of the static object and the image of the dynamic object by using at least one mesh.

In the descriptions above, the processes S810 to S840 may be divided into additional processes or combined into fewer processes depending on an embodiment. In addition, some of the processes may be omitted and the sequence of the processes may be changed if necessary.

The method for providing virtual reality contents by the content providing server and the user device described above with reference to FIG. 1 to FIG. 8 can be implemented in a computer program stored in a medium to be executed by a computer or a storage medium including instructions codes executable by a computer. Also, the method for providing virtual reality contents by the content providing server and the user device described above with reference to FIG. 1 to FIG. 8 can be implemented in a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A content providing server that provides three-dimensional (3D) virtual reality content, comprising:
   a requesting unit configured to receive a request for 3D virtual reality content from a user device;
   a dynamic object image processing unit configured to render a 3D image of a dynamic object contained in the 3D virtual reality content;
   a static object image processing unit configured to render a 3D image of a static object contained in the 3D virtual reality content,
      wherein the static object includes a background or a space contained in the 3D virtual reality content in which data of the static object is not changed in a flow of the 3D virtual reality content, and
      wherein the static object image processing unit is configured to derive a depthmap from an image taken based on a user location in the 3D virtual reality content,
      wherein the depthmap is a distance value for 3D data corresponding to each pixel in the image based on the user location in the 3D virtual reality content; and
   a streaming unit configured to separately stream the 3D rendered image of the dynamic object and the 3D rendered image of the static object to the user device,
      wherein the streaming unit is configured to only stream the 3D rendered image of the static object to the user device when a predetermined event causes the 3D image of the static object in the 3D virtual reality content to be updated.

2. The content providing server of claim 1, wherein
   the dynamic object image processing unit is configured to render the 3D image of the dynamic object by using an image taken based on a location of a user in the 3D virtual reality content, and
   the streaming unit is configured to stream the 3D rendered image of the dynamic object to the user device in real time.

3. The content providing server of claim 2, wherein the static object image processing unit is configured to render the 3D image of the static object taken based on the location of the user in the 3D virtual reality content.

4. The content providing server of claim 3, wherein the streaming unit is configured to stream the 3D rendered image of the static object when the 3D virtual reality content starts to be reproduced.

5. The content providing server of claim 3, wherein the streaming unit is configured to stream the 3D rendered image of the static object when a scene in the 3D virtual reality content is required to be updated.

6. The content providing server of claim 3, wherein the streaming unit is configured to stream the 3D rendered image of the static object when the location of the user in the 3D virtual reality content reaches a predetermined area.

7. The content providing server of claim 3, wherein the streaming unit is configured to stream the 3D rendered image of the static object when an update time for the 3D image of the static object exceeds a predetermined time.

8. The content providing server of claim 1, wherein the streaming unit is further configured to stream the depthmap to the user device.

9. A user device that provides three-dimensional (3D) virtual reality content, comprising:
a requesting unit configured to request 3D virtual reality content to a content providing server;
a dynamic object image receiving unit configured to receive a 3D image of a dynamic object contained in the 3D virtual reality content;
a static object image receiving unit configured to receive a 3D image of a static object contained in the 3D virtual reality content,
wherein the static object includes a background or a space contained in the 3D virtual reality content in which data of the static object is not changed in a flow of the 3D virtual reality content, and
wherein the static object image receiving unit is configured to receive a depthmap from an image taken based on a user location in the 3D virtual reality content,
wherein the depthmap is a distance value for 3D data corresponding to each pixel in the image based on the user location in the 3D virtual reality content; and
an output unit configured to output the 3D image of the static object and the 3D image of the dynamic object by using at least one mesh,
wherein the dynamic object image receiving unit and the static object image receiving unit are further configured to receive a stream of the 3D image of the dynamic object and a stream of the 3D image of the static object, respectively, from the content providing server, and
the static object image receiving unit is further configured to only receive a stream of the 3D image of the static object from the content providing server when a predetermined event causes the static object in the 3D virtual reality content to be updated, and the 3D image of the static object is output on the at least one mesh to which the depthmap has been applied.

10. The user device of claim 9, wherein the dynamic object image receiving unit is further configured to receive a stream of the 3D image of the dynamic object from the content providing server in real time.

11. The user device of claim 10, wherein the static object image receiving unit is configured to receive a stream of the 3D image of the static object when the 3D virtual reality content starts to be reproduced.

12. The user device of claim 10, wherein the static object image receiving unit is configured to receive a stream of the 3D image of the static object when a scene in the 3D virtual reality content is required to be updated.

13. The user device of claim 10, wherein the static object image receiving unit is configured to receive a stream of the 3D image of the static object when a location of a user in the 3D virtual reality content reaches a predetermined area.

14. The user device of claim 10, wherein the static object image receiving unit is configured to receive a stream of the 3D image of the static object when an update time for the 3D image of the static object exceeds a predetermined time.

15. A user device that provides three-dimensional (3D) virtual reality content, comprising:
a requesting unit configured to request 3D virtual reality content to a content providing server;
a dynamic object image receiving unit configured to receive a 3D image of a dynamic object contained in the 3D virtual reality content;
a static object image receiving unit configured to receive a 3D image of a static object contained in the 3D virtual reality content,
wherein the static object includes a background or a space contained in the 3D virtual reality content in which data of the static object is not changed in a flow of the 3D virtual reality content; and
an output unit configured to output the 3D image of the static object and the 3D image of the dynamic object by using at least one mesh,
wherein the dynamic object image receiving unit and the static object image receiving unit are further configured to receive a stream of the 3D image of the dynamic object and a stream of the 3D image of the static object, respectively, from the content providing server, and
the static object image receiving unit is further configured to only receive a stream of the 3D image of the static object from the content providing server depending on whether or not a predetermined event for the static object occurs in the 3D virtual reality content,
wherein the static object image receiving unit is further configured to receive a stream of a depthmap derived from an image taken based on a location of a user in the virtual reality content, and
wherein the output unit is further configured to:
output the 3D image of the dynamic object on a first mesh; and
output the 3D image of the static object on a second mesh to which the depthmap has been applied,
wherein
the first mesh is located inside the second mesh, and
the first mesh is a spherical or cubic mesh and the second mesh is a deformed mesh.

16. The user device of claim 15, wherein the dynamic object image receiving unit is further configured to receive a stream of the 3D image of the dynamic object from the content providing server in real time.

17. The user device of claim 16, wherein the static object image receiving unit is configured to receive a stream of the 3D image of the static object based on at least one of the following:
when the 3D virtual reality content starts to be reproduced,
when a scene in the 3D virtual reality content is required to be updated, when a location of a user in the 3D virtual reality content reaches a predetermined area, and when an update time for the 3D image of the static object exceeds a predetermined time.

18. A method for providing three-dimensional (3D) virtual reality content, comprising:
- receiving a request for 3D virtual reality content from a user device;
- rendering a 3D image of a dynamic object contained in the 3D virtual reality content;
- rendering a 3D image of a static object contained in the 3D virtual reality content,
    - wherein the static object includes a background or a space contained in the 3D virtual reality content in which data of the static object is not changed in a flow of the 3D virtual reality content;
- deriving a depthmap from an image taken based on a user location in the 3D virtual reality content, wherein the depthmap is a distance value for 3D data corresponding to each pixel in the image based on the user location in the 3D virtual reality content; and
- separately streaming the 3D rendered image of the dynamic object and the 3D rendered image of the static object to the user device,
    - the streaming of the 3D rendered image of the static object includes only streaming the 3D rendered image of the static object to the user device when a predetermined event causes the 3D image of the static object in the 3D virtual reality content to be updated.

* * * * *